United States Patent Office 3,202,724
Patented Aug. 24, 1965

3,202,724
DEHYDROGENATION OF HYDROCARBONS
Allen H. Keough, Holden, Mass., assignor to Norton Company, Worcester, Mass., a corporation of Massachusetts
No Drawing. Filed July 17, 1961, Ser. No. 124,371
2 Claims. (Cl. 260—668)

This invention relates to the catalytic dehydrogenation of hyrocarbons boiling within or below the gasoline boiling range.

Motor fuels such as gasoline may be improved in areomatic content by the process of my invention or specific desired unsaturated materials may be produced from the corresponding saturated hydrocarbons.

It is an object of this invention to produce olefins by a catalytic process which is efficient and utilizes a catalyst of high activity and low cost.

The above and other objects of this invention are achieved by use of the high surface area ceramic material disclosed and claimed in the copending application Serial No. 100,031 of Osgood J. Whittemore, Jr., filed April 3, 1961. As more fully described in application Serial No. 100,031, these materials are formed by mixing together a silicate mineral and a boron compound capable of producing boron trioxide upon firing. The mixture is fired for a time sufficient for the boron trioxide to substantially react with the silicate mineral. The fired mixture is therefore leached to remove any water soluble residue and to increase the absorptive powers and surface area thereof. The temperature of firing is below the vitrification range of the silicate mineral.

For use in the dehydrogenation process of the present invention, the silicate material may be treated with a material such as a platinum salt, which is subsequently reduced to activity by hydrogen. The platinum salt may be added to the raw batch before firing or the fired material may be treated after it has been leached.

Naturally occurring silicate minerals, e.g. zircon, the feldspars, wollastonite, petalite, etc., and particularly the hydrosilicate clays or earths, e.g. kaolin, ball clay, diatomaceous earth, attapulgite, bentonite, vermiculite, talc, asbestos, pyrophyllite, and mixtures thereof may be employed as the silicate source to form the catalytic material useful in this invention.

The boron compound is preferably utilized in an amount sufficient to produce the weight ratio of boron trioxide to silicate material of between about 1:30 and 1:1. On this basis, when using boric acid and kaolin, the weight ratio of boric acid to the clay may range between about 1:5 and 2:1. Stated another way, the mixture may contain from about 35 to 94% kaolin and from 6 to 65% boric acid.

The firing temperature, as noted in the Whittemore application above referred to, may range between 600° C. and 1400° C., with a preferred range between about 800° C. and 1300° C. The firing time may range from minutes or less for microspheres to 60 hours, depending upon the mass of the shape to be fired.

Illustrative of the process of this invention, a catalyst was prepared from alumina, kaolin, boric acid and platinum tetrachloride, and, after activation by hydrogen, was employed in the dehydrogenation of methylcyclohexane.

The catalyst in this example was prepared by mixing 70% of 70 mesh pure fused alumina with 15% kaolin, 15% boric acid, an amount of platinum tetrachloride to give 0.4% (by weight of dry solids) of platinum. Water was added in a sufficient amount to permit extrusion into pellets. The pellets were fired at 1000° C. for 6 hours, hot water leached, and dried. The surface area was 44 square meters per gram.

*Example*

Methylcyclohexane, at a liquid hourly space velocity of 0.5, was passed through a bed of the catalyst in a stream of hydrogen at 355° C. to 360° C. The mole ratio of hydrogen to methylcyclohexane was about 1.3. Examination of the products from the reaction showed only methylcyclohexane and toluene. The conversion of the methylcyclohexane was 53%.

What is claimed is:
1. A process for dehydrogenating hydrocarbons comprising contacting a saturated hydrocarbon at conversion temperatures with a catalyst formed by firing a mixture of a silicate mineral, alumina, a boron compound selected from the group consisting of boric acid, boric oxide, calcium borate, and sodium tetraborate and a platinum source, leaching the fired product to remove water soluble residue, and reducing said platinum source to elemental platinum on and within said catalyst.
2. A process as in claim 1 in which methylcyclohexane is converted to toluene.

References Cited by the Examiner
UNITED STATES PATENTS

| 2,164,500 | 7/39 | Cummins et al. | 252—432 |
| 2,550,531 | 4/51 | Ciapetta | 260—668 |
| 2,551,580 | 5/51 | Bond | 252—450 |
| 2,706,208 | 4/55 | Pines et al. | 260—668 |
| 2,751,333 | 6/56 | Heinemann | 260—668 |
| 2,938,001 | 5/60 | deRosset | 252—432 |

ALPHONSO D. SULLIVAN, *Primary Examiner.*